United States Patent
Scott

[19]

[11] Patent Number: 6,158,203
[45] Date of Patent: Dec. 12, 2000

[54] OVER THE ROW TRACTOR AND CROP HARVESTER

[76] Inventor: Phillip Ray Scott, 29846 Corral Ct. North, Coarse Gold, Calif. 93614

[21] Appl. No.: 09/226,383

[22] Filed: Jan. 6, 1999

[51] Int. Cl.[7] .................................................. A01D 46/00
[52] U.S. Cl. .............................................. 56/328.1; 56/330
[58] Field of Search .................... 56/328.1, 330, 56/14.9, 340.1, 2, 473.5

[56] References Cited

U.S. PATENT DOCUMENTS

| | | | |
|---|---|---|---|
| 3,979,891 | 9/1976 | Patton | 56/328 R |
| 4,543,775 | 10/1985 | Horn et al. | 56/235 |
| 4,683,969 | 8/1987 | Littau | 180/6.48 |
| 4,750,751 | 6/1988 | Schafer | 280/6 H |
| 5,154,568 | 10/1992 | Conner et al. | 414/392 |
| 5,159,989 | 11/1992 | Claxton | 180/41 |
| 5,236,294 | 8/1993 | Willis | 414/24.5 |
| 5,355,667 | 10/1994 | Scott | 56/330 |
| 5,495,708 | 3/1996 | Scott et al. | 56/329 |
| 5,529,452 | 6/1996 | Boyles et al. | 414/460 |
| 5,742,228 | 4/1998 | Levy | 340/429 |
| 5,771,672 | 6/1998 | Gummerson | 56/15.4 |
| 5,839,954 | 11/1998 | Schloesser et al. | 460/45 |
| 5,988,654 | 11/1999 | Wix et al. | 280/6.15 |

FOREIGN PATENT DOCUMENTS

| | | | |
|---|---|---|---|
| 2530-404-A | 1/1984 | France | 56/328.1 |
| 2553-252-A | 4/1985 | France | 56/328.1 |

*Primary Examiner*—Thomas B. Will
*Assistant Examiner*—Arpad Fabian Kovacs
*Attorney, Agent, or Firm*—Henry M. Stanley

[57] ABSTRACT

A tractor for over the row in line towing of a trailer along a row of plants, wherein either the trailer or the tractor itself has the capability of carrying mechanisms for performing certain operations on a row crop. Such mechanisms include crop harvesters, plant pruners, plant sprayers or device for tilling the ground adjacent the plant rows. Use of these mechanisms in sloping fields is specifically envisioned. A portion of the tractor is designed to carry these mechanisms and is maintained in a level configuration in fields of row crops without substantial elevation of the tractor center of gravity. The main elements of the tractor are kept near ground level for easy access in all types of row crop terrain, sloping or otherwise, so that fueling and maintenance tasks may be readily performed and ground access to an operator's station is always available.

23 Claims, 6 Drawing Sheets

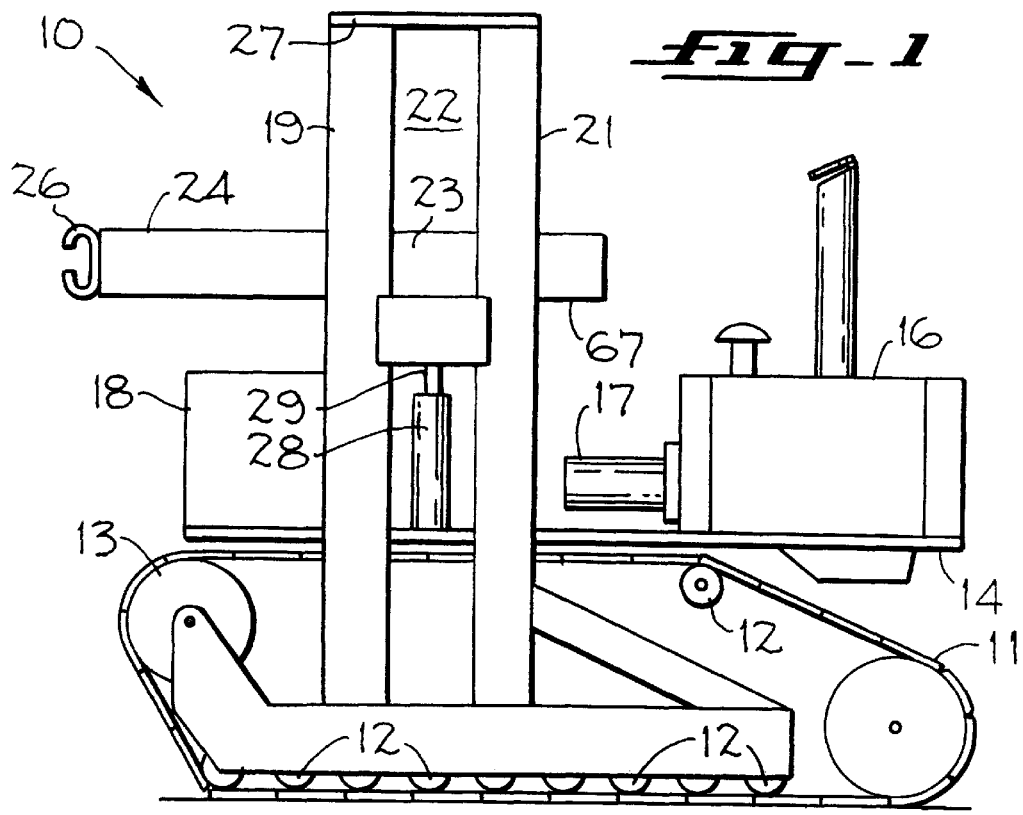
fig_1
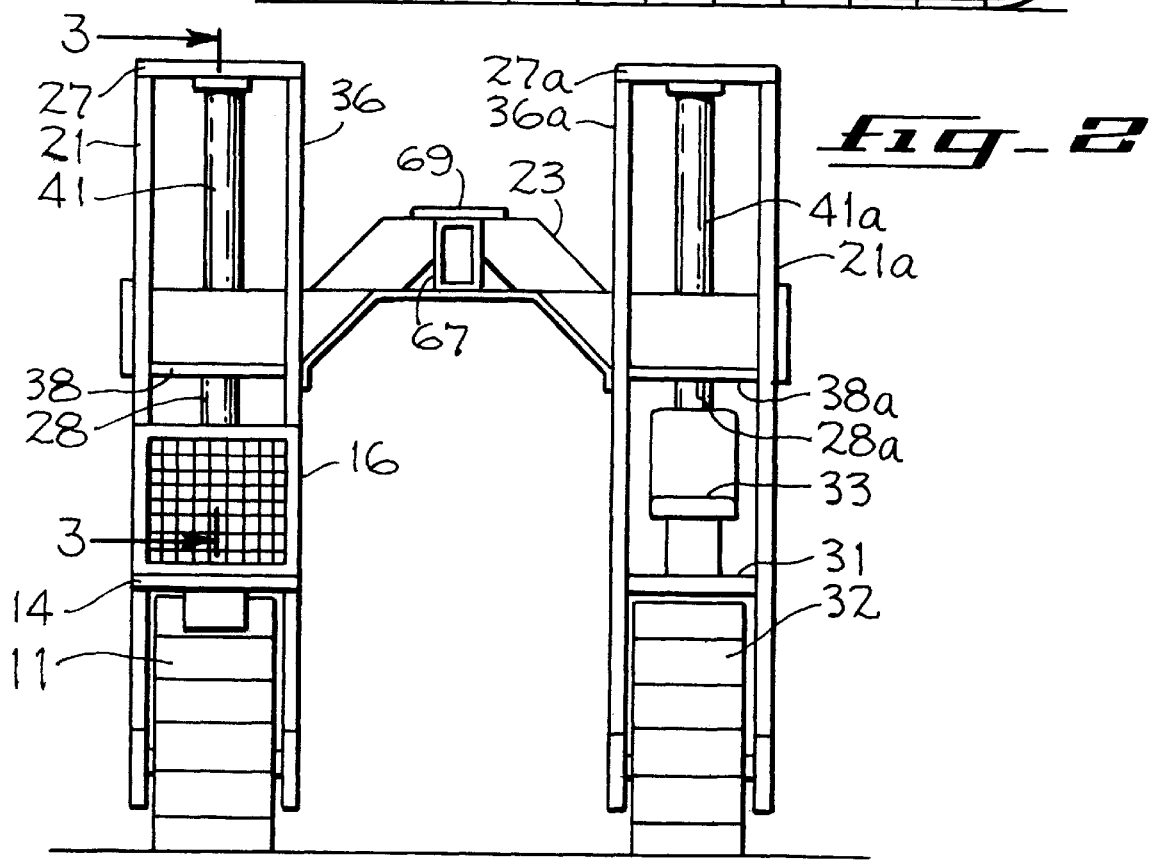
fig_2

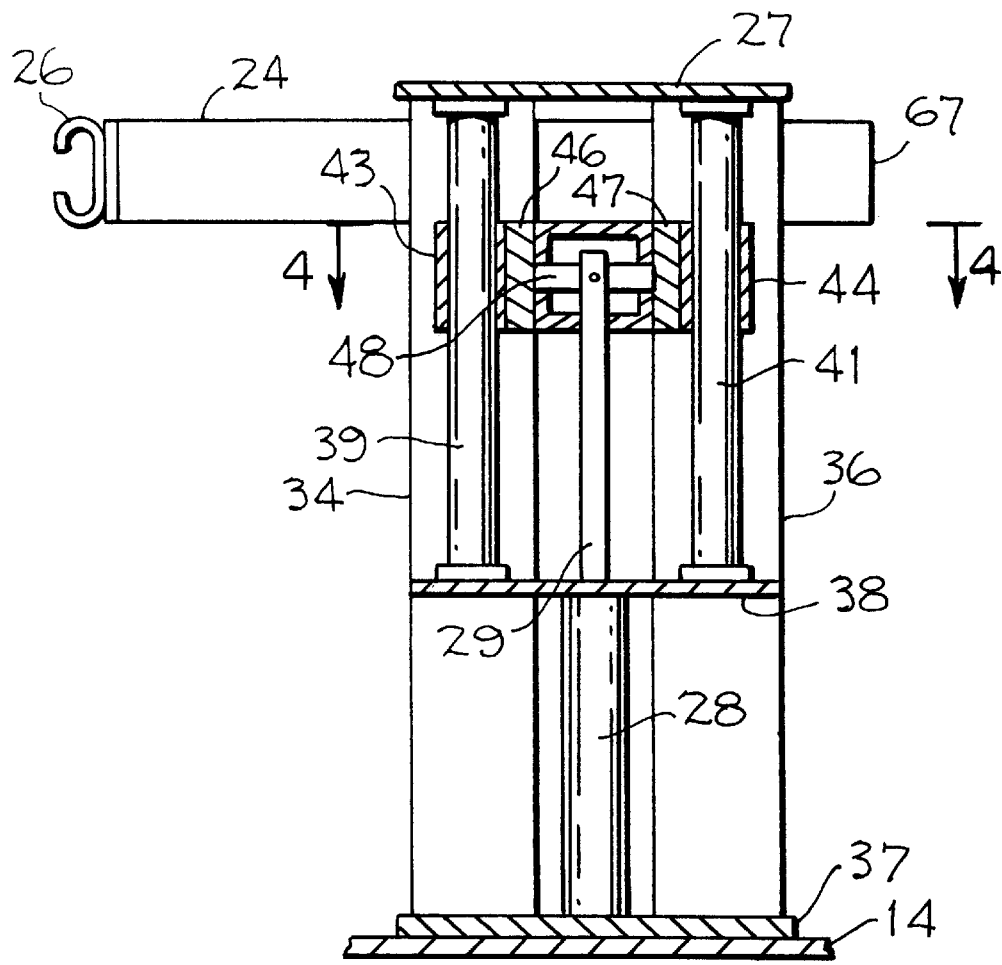
fig_3
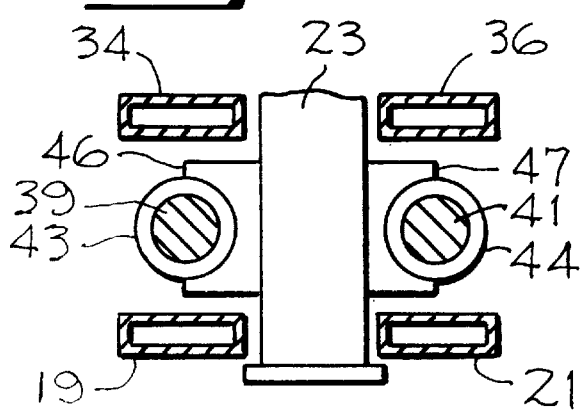
fig_4

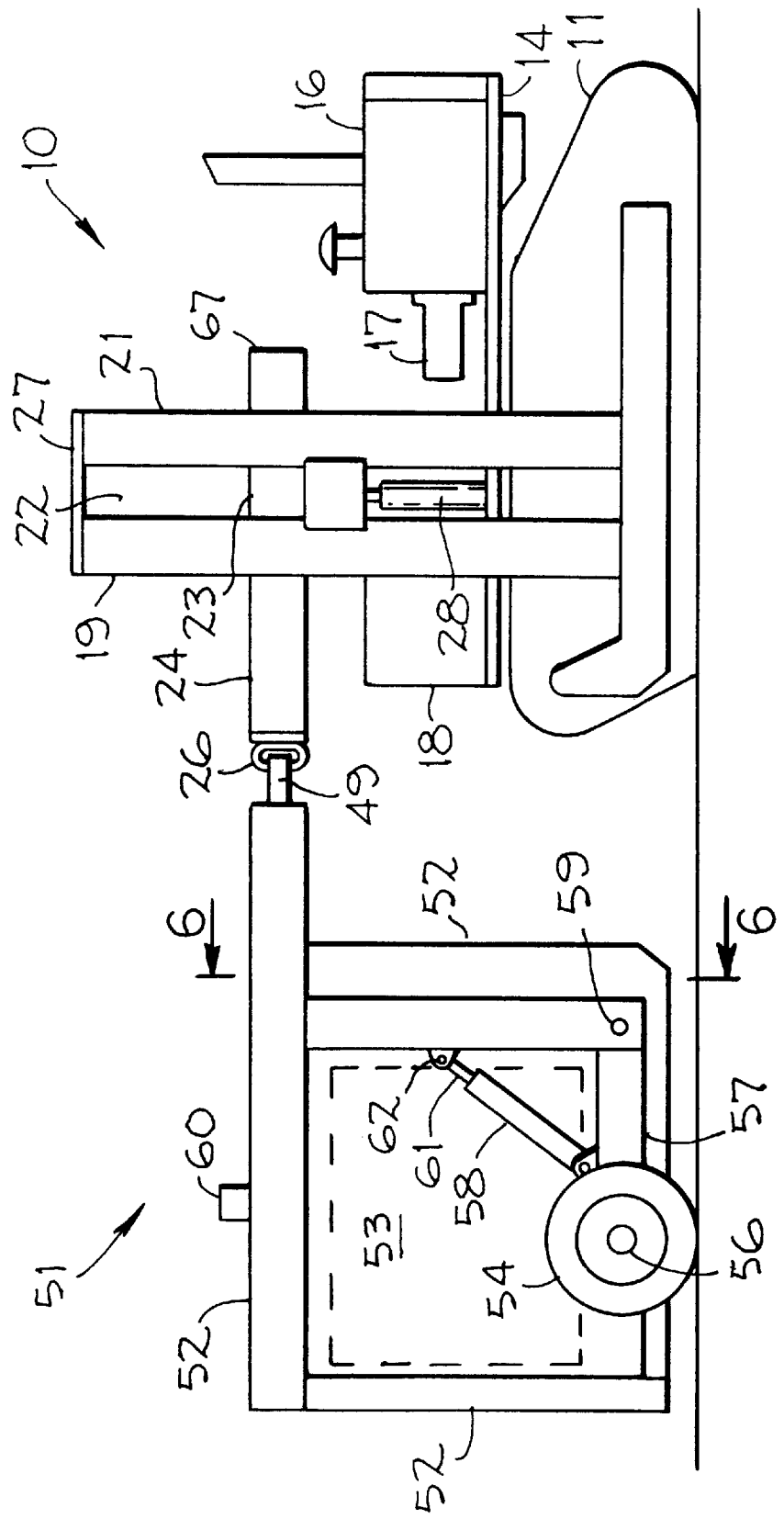

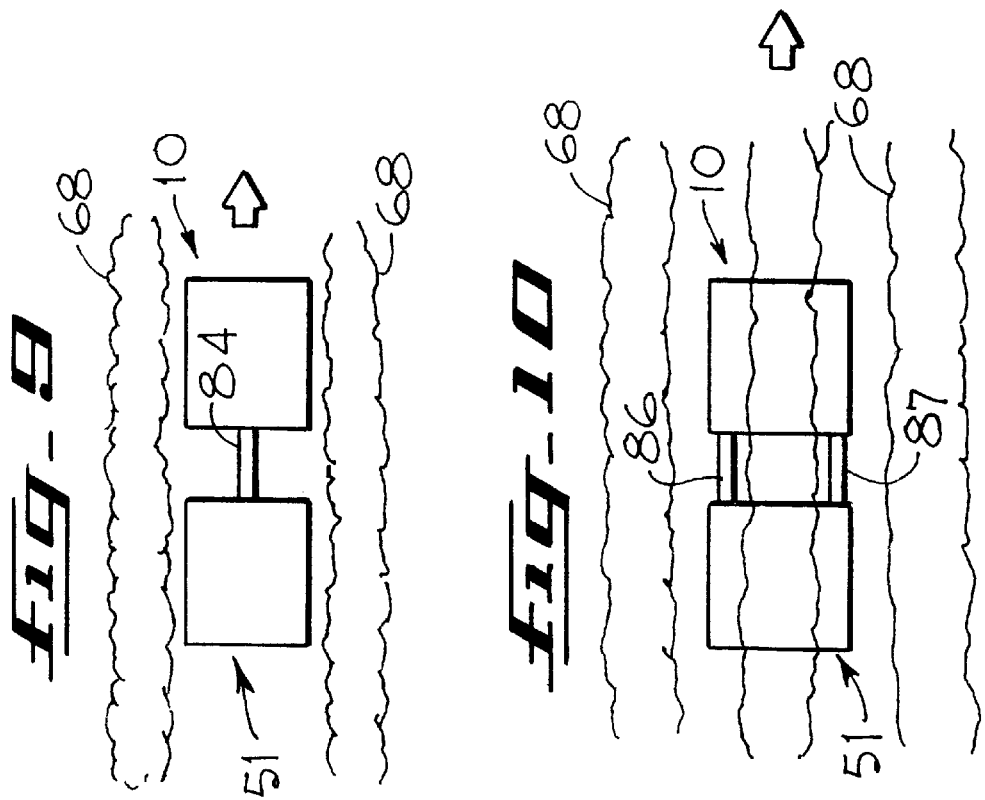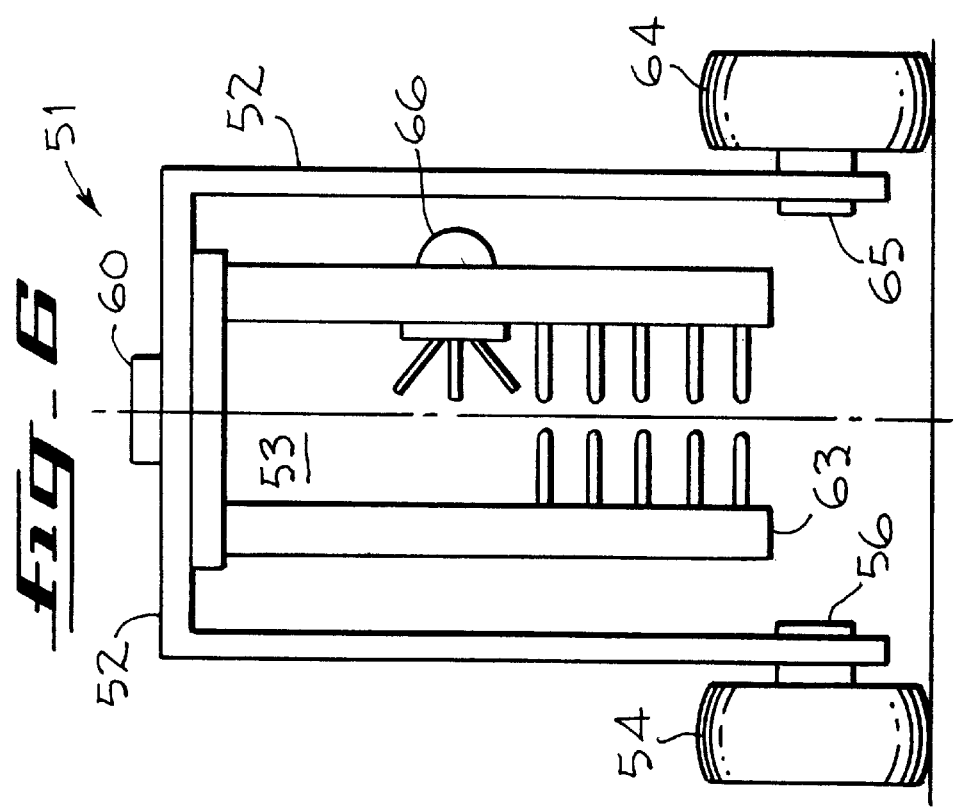

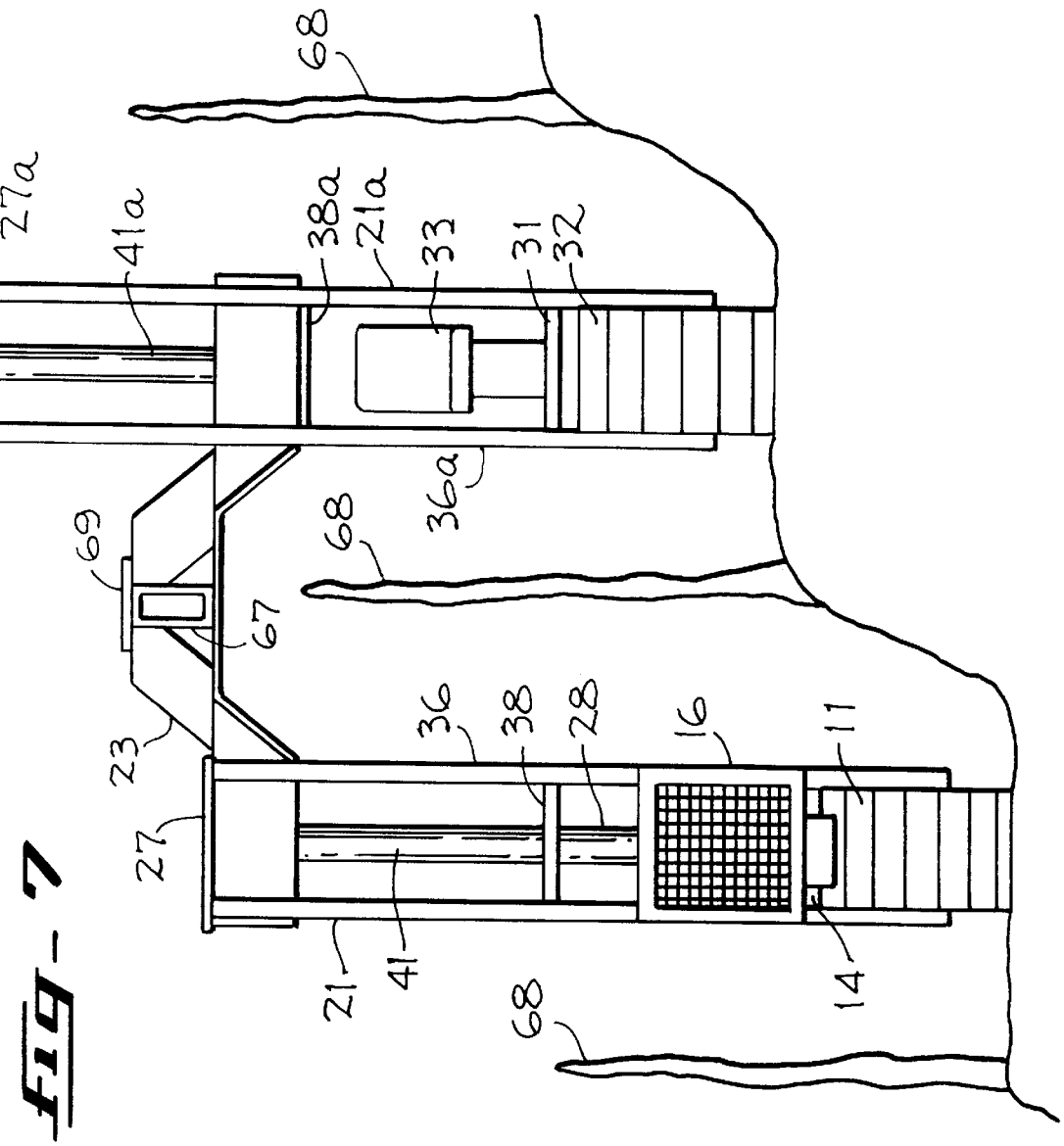

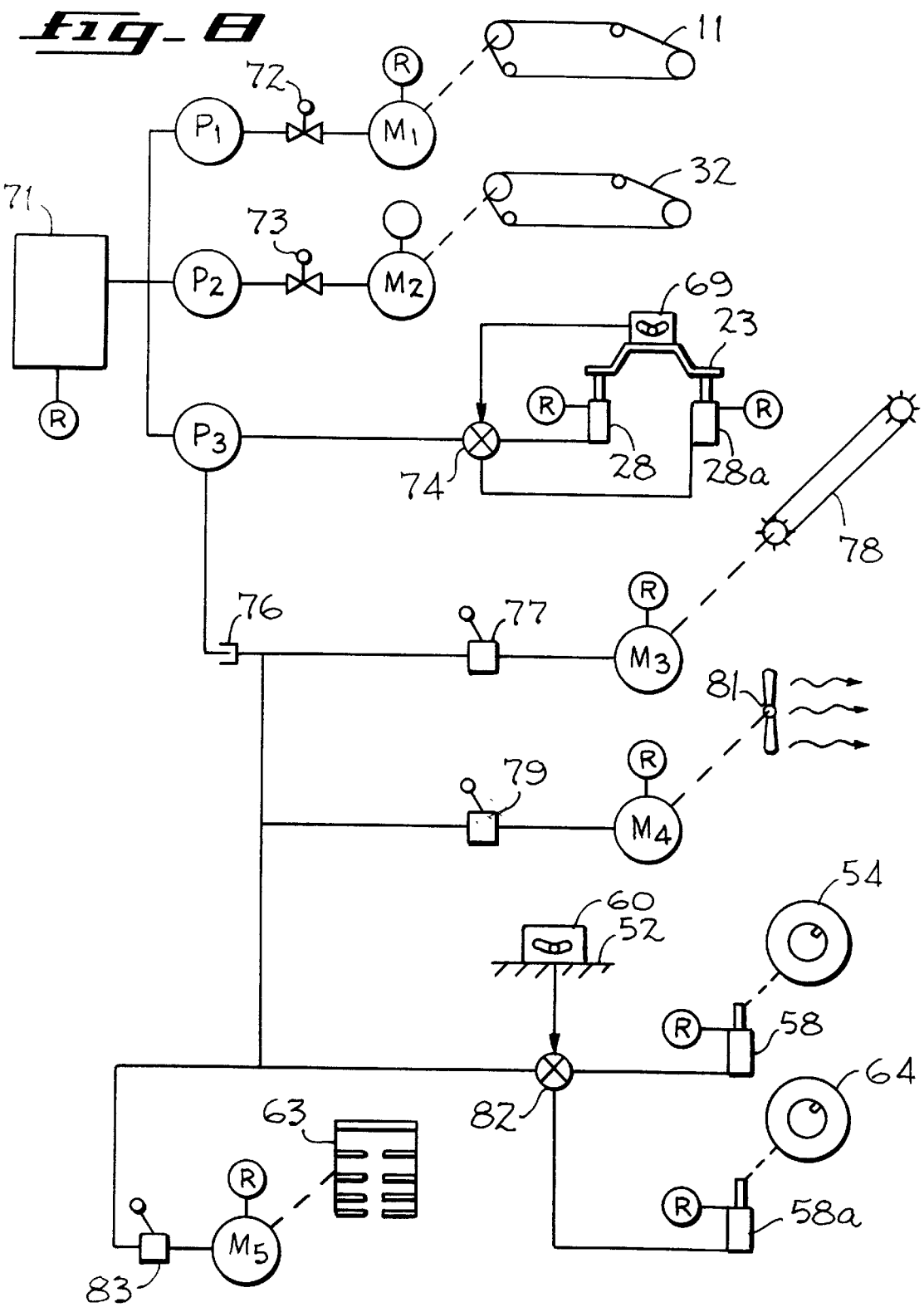
Fig_8

OVER THE ROW TRACTOR AND CROP HARVESTER

SUMMARY OF THE INVENTION

A tractor is disclosed for running on an underlying surface and over a row of plants in a plurality of plant rows carrying a crop to be harvested. The tractor includes a right side frame, a left side frame, and a center section having a right side and a left side supported for adjustable vertical movement on the right side frame and the left side frame, respectively. Power means is mounted on one of the right side frame and the left side frame and traction means is provided on each of the right and left side frames. The traction means is coupled to the power means. The traction means contacts the underlying surface to provide movement of the tractor thereover. An operator control station is provided from which control of the tractor movement occurs. First means is coupled to the power means for moving the center section right side vertically on the right side frame. Second means is coupled to the power means for moving the center section left side vertically on the left side frame. Level sensing means is mounted on the center section in communication with the first and second means for moving so that a change in the right side frame elevation results in a substantially equal and opposite change in the center section right side elevation and a change in the left side frame elevation results in a substantially equal and opposite change in the center section left side elevation.

In another aspect of the invention a multi-use tractor is disclosed for running on an underlying surface along a row of plants carrying a crop in a plurality of plant rows growing from the underlying surface. A split frame having a right frame side and a left frame side is provided together with traction means on the right frame side and the left frame side for contacting the underlying surface. A power source is provided on the split frame for driving the traction means. Auxiliary equipment is provided on the split frame. Means for driving the auxiliary equipment is also provided on the split frame. A tractor and auxiliary equipment control station is provided on the split frame. The power source, auxiliary equipment, means for driving, and tractor and auxiliary equipment control station are dispersed over the right side frame and the left side frame. A lateral cross member has a right end and a left end and means is mounted on the right frame side for receiving the right end for generally vertical sliding movement therein. Means is mounted on the left frame side for receiving the left end for generally vertical sliding movement therein. First controllable means is provided for moving the lateral cross member right end in elevation relative to the right frame side. Second controllable means is provided for moving the lateral cross member left end in elevation relative to the left frame side. Means is provided for sensing level of the lateral cross member and for actuating the first and second controllable means to adjust the elevation of the right end and the left end relative to the right frame side and the left frame side, respectively, to thereby achieve a level condition in the lateral cross member.

In yet another aspect of the invention, an over the row configured tractor is disclosed for working over a row of plants in a field of multiple rows of plants and for working between rows and on multiple rows. The tractor includes a right frame, a left frame, a power source mounted on one of the right frame and left frame, a right continuous track mounted on the right frame for contacting the field and a left continuous track mounted on the left frame for contacting the field, wherein both continuous tracks are connected to the power source. A lateral level bar has a right end and a left end, together with right means mounted on the right frame for supporting the right end and for providing vertical movement of the right end relative to the right continuous track and left means mounted on the left frame for supporting the left end and for providing vertical movement of the left end relative to the left continuous track. Further, level sensing means is provided on the lateral level bar which produces a signal connected to the right means mounted on the right frame and the left means mounted on the left frame, whereby the signal operating on the right means and the left means functions first to move the high side of the lateral level bar down and second to move the low side of the lateral level bar up. In this fashion, the center of gravity of the over the row configured tractor stays substantially the same on laterally sloping surfaces without regard to the position of the lateral level bar.

The invention relates to an over the row tractor which moves over and along a row of plants and which maintains a substantially constant center of gravity height over an underlying support surface even in sloping surface conditions. A right frame, a left frame and a power source are included. First means is coupled to the power source for supporting the right frame for movement over the support surface. Second means is coupled to the power source for supporting the left frame for movement over the support surface. Additionally, a lateral leveling bar provides a bridge between the right frame and the left frame. The leveling bar has a right end and a left end together with leveling means for sensing variation from level in the lateral leveling bar. Right means is present on the right frame for supporting the right end and for providing vertical movement thereon. Left means is provided on the left frame for supporting the left end and for providing vertical movement thereon. The leveling means is in communication with the right means and the left means for urging the higher of the right end and the left end down and the lower of the right end and the left end up.

A method is disclosed for leveling a harvesting tool supported by a laterally extending member in a harvesting machine. The harvesting machine has laterally spaced first and second ground engaging apparatus providing movement over underlying ground and further has laterally spaced first and second frame structures extending above and attached to the laterally spaced ground engaging apparatus respectively. The method includes the steps of supporting one end of the laterally extending member in the first frame structure for vertical movement therein and supporting the opposing end of the laterally extending member in the second frame structure for vertical movement therein. The step of providing a low position stop for the one end and the opposing end of the laterally extending member is included together with sensing the attitude of the laterally extending member and producing a level indicating signal therefrom. Ultimately the steps are included of moving the high end of the laterally extending member down in response to the level indicating signal and, when the high end is on the low position stop, moving the low end of the laterally extending member up in response to the level indication signal.

BRIEF DESCRIPTION OF THE DRAWINGS

FIG. 1 is a side elevation of the tractor of the present invention.

FIG. 2 is a front elevation of the tractor of the present invention.

FIG. 3 is a section along the line 3—3 of FIG. 2.

FIG. 4 is a section along the line 4—4 of FIG. 3.

FIG. 5 is a side elevation of the tractor of the present invention pulling a trailer.

FIG. 6 is a section along the line 6—6 of FIG. 5.

FIG. 7 is a front elevation of the tractor of the present invention accommodating lateral slope in a field growing a crop in rows.

FIG. 8 is a hydraulic schematic showing one manner of providing power to the various components of the system of the present invention.

FIG. 9 is a plan of an additional use of the present invention.

FIG. 10 is a plan of yet another use of the present invention.

DESCRIPTION OF THE PREFERRED EMBODIMENTS

Mechanical over the row harvesters fill into two common categories, self propelled and towed units. Two-wheel drive harvesters are known which cannot be leveled and are therefore exclusively for use on level terrain. Two- and four-wheel drive machines have been developed which have leveling capabilities for hillside applications. In these latter machines sometimes the harvesting module and conveyers are removable so that the over the row tractor may be used for more than just harvesting. In these cases, the tractor is not necessarily designed as a multi-use tractor and the removal and replacement of harvesting components can require a considerable investment of labor time. Further, with the harvesting components removed, many of such harvesters become unstable and have a very high center of gravity.

In the leveling type of such harvesting tractors, hydraulically extendible legs are provided by which the support wheels on which the harvesters run may be pushed downward on the low side of the machine. This raises the frame on the downhill side of the machine to permit the tractor deck to remain level. As a result, the legs are longer on the low side of the machine. This results in a higher center of gravity with respect to the ground on the downhill side of the machine. Clearly, once the limit of the leveling capability of the machine is reached, terrain having a greater slope will cause the harvesting machine to tilt and considerably increase the likelihood that the high center of gravity will cause the machine to overturn, causing extensive damage or injury. Towable harvesting units have been provided in the past which are towed with an existing farm tractor. The harvester is positioned to straddle a row of plants being harvested and the tractor is offset driving beside the row being harvested. A hitch is attached to one corner of the harvester and is towed in an offset manner by the tractor through the field of plant rows. In this configuration, the side pull is very high against the rear of the tractor. This results from the fact that any towed unit tries to center itself behind the towing vehicle. On wet ground and in pronounced hillside applications this side pull can become an appreciable problem. Going uphill the harvester tries to pull the rear of the tractor into the plant row and going downhill the harvester tends to push the nose of the tractor into the plant row. Consequently, a higher degree of skill is required of the tractor operator in towing an over the row harvester with a beside the row tractor.

Turning to FIG. 1 of the drawings a side view of an over the row tractor 10 is shown having a continuous track 11 configured to contact an underlying surface upon which the tractor runs. The continuous track moves around a path defined by a number of idler wheels 12 and is driven by a drive wheel 13. The idler wheels and the drive wheel are supported for rotation on a right side framework (as seen in FIG. 1) represented by the deck 14 which is a part of the framework. A power source represented by the engine 16 in FIG. 1 is mounted on the deck 14 and is connected to and therefore used for powering a hydrostatic drive 17 in this embodiment. The hydrostatic drive is preferred, because it allows an infinite control of ground speed by providing for control of the speed of the track 11 while allowing full RPM in the engine 16 to obtain better performance of hydraulic functions performed by the tractor or by a towable harvester trailer which will be hereinafter described.

Also resting on top of the frame represented by the deck 14 is a box 18 containing hydraulic couplings and fittings. Extending upwardly from the frame represented by the deck 14 and attached thereto are four twelve inch by three inch rectangular tubes, two of which 19 and 21 are seen in FIG. 1, which form a channel 22 therebetween. A lateral crossbar 23, the right end of which may be seen in FIG. 1, has the right end thereof disposed within the channel 22. The lateral crossbar 23 has a longitudinally rearward extending portion 24 thereon, at the rear end of which is attached a hitch 26. A top plate 27 is attached across the top of the four upwardly extending beams (19 and 21 of which are visible in FIG. 1) to secure the width of the channel 22. A hydraulic cylinder 28 is shown having one end anchored to the deck 14 on the frame and having an extending arm 29 attached to the right end of the lateral crossbar 23 for positioning the right end of the lateral bar at selected heights along the channel 22.

FIG. 1 shows only the right side profile of the tractor 10, wherein FIG. 2 shows in frontal elevation that the frame containing the deck 14 is one side, the right side, of a split frame. On the opposing side of the tractor 10 a deck 31 is seen which is on a left side frame on the tractor. The left side frame has a left continuous track 32 mounted thereon in much the same fashion as depicted for the track 11 in FIG. 1. An operator's station 33 is seen on the left side frame. The operator's station is where the controls are located which direct the power from the hydrostatic drive 17 to each of the ground engaging right and left continuous tracks 11 and 32 for controlling forward and reverse speeds as well as turning for the tractor 10. The continuous tracks are incorporated in the tractor to minimize ground pressure and soil compaction in the root area of the growing plants in the row of plants as the tractor is maneuvered either alongside or over the plants.

The lateral crossbar 23 is seen in clearer perspective in FIG. 2 wherein the center of the crossbar is built upwardly relative to the ends thereof. Crossbar 23 is a welded steel assembly which, when completed and installed in the tractor 10, provides a seven foot clearance over the underlying surface on which the tractor rests when the lateral crossbar 23 is at its lowest position. The maximum width of the tractor 10 is 100 inches so that no restrictions are incurred for running or hauling the tractor along public roads. The center opening between the right and left side frames as seen in FIG. 2 is forty eight inches wide, thereby allowing the tractor to be used on row spacings as narrow as sixty inches. The deck 31 on the left side frame carries a fuel tank (not shown) behind the operator's station 33 and a hydraulic tank (not shown) on the after end of the deck 31. Appropriate flexible hydraulic and fuel conduit is used to transmit the hydraulic fluid and fuel between the right side frame and the left side and to other auxiliary hydraulically driven equipment for performing enhancement functions on the plants and the crop borne by the plants in the plant rows. Such enhancement functions are exemplified by harvesting, pruning, spraying, tilling the soil adjacent the plant rows, etc.

It may be seen from FIGS. 1 and 2 that the heavy components of the tractor 10; i. e., the engine 16, the hydraulic couplings box 18, hydraulic reservoir (not shown), the engine fuel tank (not shown), the operator's station 33, the continuous tracks 11 and 32 and the drives therefor, all stay at a constant elevation over the ground whether mounted on the left or right side frames represented by the steel decks 31 and 14. As a consequence, the center of gravity of the harvester disclosed herein is substantially constant relative to the underlying ground surface. The only structure that moves vertically relative to the underlying side frames are the right and left ends of the lateral crossbar 23. The lateral crossbar may be raised approximately three feet in the structure shown in FIGS. 1 and 2, which will be described in more detail hereinafter. It should also be noted that the positioning of the components in tractor 10 on the right and left side frames leaves them in fixed vertical position low to the ground and easily accessible for maintenance and repair. The hydraulic and fuel lines extend from side to side in the tractor over the lateral crossbar 23. In addition there are hydraulic couplings accessible on the tractor 10 for connection to auxiliary equipment for performing plant enhancement functions, wherein the auxiliary equipment is carried within the tractor or within a towable trailer.

FIG. 3 of the drawings shows a section through the tower assembly on the right side frame of the tractor 10. FIG. 4 is another section looking downwardly through the tower on the right side frame. Referring to FIGS. 3 and 4 together, the 3×12 inch steel tubing members 19 and 21 of FIG. 1 are now seen to cooperate with a similar pair of steel tubing members 34 and 36 attached to and extending upwardly from the right side frame represented by the deck 14. A lower plate 37 has attached thereto the bottom ends of each of the upwardly extending rectangular tubes 19, 21, 34 and 36 to properly space the bottom ends of the tubes. The lower plate is in turn attached to the deck 14 on the right side frame. The lower end of the hydraulic cylinder 28 is also fixed to the plate 37. A middle plate 38 is also attached to the four pieces of upwardly extending rectangular tubing to provide further rigidity for the upwardly extending assembly. A pair of upwardly extending columns 39 and 41 are fixed at the bottoms thereof to the upper surface of the middle plate 38. As previously mentioned, the top plate 27 is fixed to the tops of the upwardly extending pieces of rectangular tubing 19, 21, 34 and 36. The top plate 27 also spaces and anchors the upper ends of the columns 39 and 41. A pair of sliding tubular sections 43 and 44 are attached to opposing sides of the lateral crossbar 23 by members 46 and 47. Contained on the inner surface of the circular tube sections 43 and 44 are brass bushings to minimize the friction between the sliding tube sections 43 and 44 and the columns 39 and 41. The top plate 27 is fixed to the upper ends of the four square tubing sections by means of bolts so that the assembly of the lateral crossbar 23 and the sliding tubular sections 43 and 44 is able to be slipped over the tops of the columns 39 and 41 and the top plate 27 then fastened in place atop the pieces of rectangular tubing.

Hydraulic cylinder 28 has an arm 29 which is extendible therefrom as mentioned hereinbefore. The free upper end of the arm 29 is pivotally attached to a pin 48 extending across the inside dimension of the lateral crossbar 23 as seen in FIG. 3. In this fashion the vertical position of the right end of lateral crossbar 23 is determined within the channel 22 by controlling the extension of the arm 29 from the hydraulic cylinder 28. The tower extending upwardly from the left side frame represented by the deck 31 in FIG. 2 is substantially a mirror image of the assemblies described in conjunction with FIGS. 3 and 4. The tower overlying the left side frame is constructed of four pieces of rectangular tubing similar to tubing items 19, 21, 34 and 36, and the position of the left end of the lateral crossbar 23 is supported in a channel similar to item 22. The height of the left end in the channel is determined by like structure to that seen as hydraulic cylinder 28 and extending arm 29 in FIGS. 3 and 4. Where similar structure appears in the Figures for the tower assembly on the left side frame, the same item numbers with the suffix "a" are shown.

Turning to FIG. 5, a less detailed depiction of the tractor 10 is seen wherein the over the row hitch 26 is coupled to a mating hitch 49 on a towable trailer seen generally at 51. The trailer 51 has a framework 52 which encloses machinery for performing functions on plants in a row of plants in a multiple row field. An enclosed volume 53 is shown by dotted line within the framework 52 within which may be mounted a harvester unit, a crop spraying unit, or a crop pruning device or the like. Harvesting is referred to herein as the primary operation performed on plants and the row of plants and the other operations mentioned herein which are performed on the plants are referred to as auxiliary plant enhancement functions.

The trailer 51, which in the embodiment of FIG. 5 takes the shape of an over the row harvester, is shown supported by a wheel 54, a similar wheel supporting the opposite side of the trailer 51. The wheel 54, and the opposite side wheel are supported on separate axles, such as axle 56 for wheel 54, which extends from one end of a kick down leg 57. A hydraulic cylinder 58 has one end thereof attached to kick down leg 57 at a distance, as shown, from a pivot point 59 at the frame end of the kick-down leg. A rod 61 extends from the hydraulic cylinder 58 and is pivotally attached at the free end thereof to a point 62 also on the frame 52. It may be seen in FIG. 5 that when the rod 61 is caused to extend from the hydraulic cylinder 58, the leg 57 and wheel 54 are kicked downwardly causing the side of the trailer 51 in the plane of the paper in FIG. 5 to be elevated. A similar hydraulic cylinder is mounted on the opposing side of trailer 51 to perform a similar function on the opposite side trailer wheel. This type of device was described in the introductory remarks in this application. The use of this leveling method and structure is warranted in the case of the trailer 51, because the mass of the trailer is relatively small and center of gravity is relatively low compared to the mass and center of gravity of the tractor 10. Also, because of the light weight of the trailer, the trailer wheels do not compact the soil over the root area adjacent the rows of plants. Further, there is little danger of raising the center of gravity of the trailer to such a height that it will tip. The combination of the hitch 26 and the mating hitch 49 provides a universal action between the tractor 10 and the trailer 51 at the point of towing. A level sensor 60 is shown in FIGS. 5 and 6 mounted on the framework 52 of the trailer 51. The leveling sensor 60 produces a signal coupled to hydraulic cylinder 58 (and to the opposite side hydraulic cylinder which is not shown) which will bring the high side of the trailer down and, if the high side is already at the down stop, will activate the hydraulics to bring the low side of the trailer up.

FIG. 6 shows the trailer 51 having a harvesting head 63 mounted within the volume 53 (FIG. 5) within the framework 52. An opposing wheel 64 carried on an axle 65 is shown in FIG. 6 for supporting the trailer 51. The means for providing leveling of the trailer including the kick down leg 57 and the hydraulic cylinder 58 is the same for the wheel 64 as that described for the wheel 54 in conjunction with FIG. 5. Also shown in FIG. 6 mounted on one of the depending arms of the harvester assembly 63 is a cane trimming device 66 which represents one type of auxiliary equipment which is considered one of the aforementioned plant enhancement functions. While both the harvester 63 and the cane cutter 66 are shown in FIG. 6, it is usual that either one or the other of these functions or some other plant enhancement function such as spraying will be performed by the trailer 51 and likely not a combination of such functions. It should further be noticed that hydraulic and electrical couplings are provided on the tractor 10 for coupling necessary electrical power and hydraulic pressure from the power producing components mounted on the tractor 10 to the devices mounted on the trailer 51; i. e., the harvester 63 or the cane cutter 66.

It should be noted in FIG. 1 that a receiver member 67 extends forwardly of the lateral crossbar 23 functioning to receive and support auxiliary equipment within the central portion of tractor 10 for performing plant enhancement functions such as cane pruning or the like. These types of auxiliary equipment are mounted close to the operator (with appropriate safety guards) so that close visual operation of cane pruning, for example, may be observed to avoid inadvertent damage to plants in a plant row. Moreover, the auxiliary equipment may be quickly mounted and demounted by means of the receiver when appropriate mounting adapting hardware is provided.

The receiver 67 may be more clearly seen in FIG. 7 of the drawings which shows the tractor 10 from the front traveling along a row of a plants 68 in a laterally sloping field of such plant rows. A left side frame including the deck 31 is shown traveling on the track 32 along a higher portion of the field. The right side frame including the deck 14 is seen traveling along its track 11 along a lower portion of the laterally sloping field. A level sensing device 69 is shown mounted on the lateral crossbar 23 functioning to sense a level or out of level condition in the lateral crossbar and to thereby produce a signal which is initially used to bring the high end of the crossbar down and, if the crossbar is at its down limit at the high end, is thereafter used to bring the low side of the crossbar up. Thus, it will be seen that in the configuration depicted by FIG. 7, if the left end of crossbar 23 (surrounding column 41a) is at its lower limit and if the left track 32 is in a gradually descending path to the level of the right track 11, the lateral crossbar 23 will be driven gradually downwardly at the right end thereof surrounding column 41 (left side of FIG. 7) until the right end of the lateral crossbar reaches its lower limit when the tracks 32 and 11 are at substantially the same level. In such an instance further lowering of the left track 32 will cause the left end of the crossbar 23 (surrounding column 41a) to rise because the right end (surrounding column 41) is at its lower limit.

In FIG. 8 a hydraulic schematic is shown for a tractor 10 and a towed trailer 51. A hydraulic reservoir 71 is connected to a pair of pumps P1 and P2 the outputs of which are controlled by a pair of flow control handles 72 and 73 which supply hydraulic motors M1 and M2 respectively. Motor M1 drives the track 11 through the drive wheel 13 on the right frame side and the motor M2 drives the track 32 through a similar drive wheel on the left frame side. The return path is shown by the symbol R from the motors M1 and M2 to the hydraulic tank 71. Another pump P3 is supplied by the hydraulic reservoir 71 which in turn provides pressure to a valve 74 positioned by the signal from the level sensor 69 mounted on the lateral crossbar 23. As stated previously the signal from the level sensor 69 will first tend to bring the high side of the lateral crossbar 23 down. If the high side of the lateral crossbar is already at the down stop, the signal will open the valve 74 to drive the low side of the crossbar upward. In this fashion, the crossbar 23 will work its way toward both of the low stops for crossbar travel at the plate 38 (FIG. 3). Return paths to the hydraulic reservoir 71 are provided as represented by the R symbol in FIG. 8 from both the hydraulic cylinders 28 and 28a.

A quick coupling 76 is shown in FIG. 8 between the tractor 10 and the towed trailer 51 which provides hydraulic pressure to a flow control valve 77. The valve 77 provides flow to a motor M3 which drives a conveyer 78 mounted on the trailer 51 for conveying the harvested crop to a transport bin (not shown). Another flow valve 79 is shown connected to the quick coupling 76 which provides flow to a motor M4 for driving a fan 81 which blows debris off of the conveyor 78 while leaving the crop to be conveyed thereon. Another valve 82 receives the signal from the level sensor 60 mounted on the framework of the trailer 51 which directs fluid to either the hydraulic cylinder 58 on the right side of the trailer or a hydraulic cylinder 58a mounted on the left side of the trailer. As described hereinbefore for the level sensor 69, the level sensor 60 first uses its signal to direct the valve 82 to provide flow to the appropriate hydraulic cylinder to move a wheel to bring the high side of the trailer down. As before, if the high side of the trailer is already against the down stop, the flow will be directed to the opposing hydraulic cylinder to move a wheel to bring the low side of the trailer up. Another valve 83 is shown in FIG. 8 which provides hydraulic pressure to drive a motor M5 which drives the harvester head 63 mounted within the trailer 51. Return paths from all hydraulically driven components in FIG. 8 to the reservoir 71 are shown by the symbol R.

As seen in FIG. 9 of the drawings, tractor 10 is drawing a trailer 51 between plant rows 68 in a field. The trailer 51 represents the structure as previously described herein, as well as any equipment of crop or plant husbandry. More than one row of the plurality of rows 68 is able to be contacted for plant enhancement using the configuration of FIG. 9, together with the auxiliary mounting adapting hardware and the auxiliary equipment for performing plant enhancement function referenced hereinbefore. A single universal hitch 84 can then be used to attach the tractor 10 to the trailer 51. In FIG. 10 the tractor 10 and the trailer 51 are shown in an over the row configuration. A pair of universal hitches or lift arms 86 and 87 may be used in positions between the tractor 10 and the trailer 51 at a lower elevation than the hitch 26 and the mating hitch 49 (FIG. 5). As a result, the configuration of FIG. 10 may be used to work as many as three rows or more at one time when the operation on the plants in the plant rows 68 is a pruning operation for example.

Although the best mode contemplated for carrying out the present invention has been shown and described herein, it will be understood that modification and variation may be made without departing from what is regarded to be the subject matter of the invention.

What is claimed:

1. A tractor having a substantially constant center of gravity over an underlying surface during lateral leveling and being configured for running on the underlying surface and over a row of plants in a plurality of plant rows carrying a crop to be harvested, comprising:

a right side frame, a left side frame, a center section having a right side and a left side supported for adjustable vertical movement relative to said right side frame and said left side frame respectively, power means mounted in fixed position on one of said right side frame and said left side frame, traction means for contacting the underlying surface and being fixedly mounted to each of said right and left side frames and coupled to said power means, said traction means providing for movement of the tractor over the underlying surface, an operator control station for providing control of tractor movement, said operator control station being mounted in fixed position on one of said right and left side frames, first means coupled to said power means for moving said center section right side vertically on said right side frame, second means coupled to said power means for moving said center section left side vertically on said left side frame, and level sensing means mounted on said center section in communication with said first and second means for moving, whereby a change in said right side frame elevation results in a substantially equal and opposite change in said center section right side elevation and a change in said left side frame elevation results in a substantially equal and opposite change in said center section left side elevation.

2. The tractor of claim 1 comprising:

an over the row hitch attached to said center section, a towed over the row harvester, an over the row mating hitch attached to said towed harvester, said over the row hitch and mating hitch combining for universal movement, means on said towed over the row harvester for contacting the underlying surface providing movement thereon, and means on said towed over the row harvester for contacting the plants in the row of plants for detaching the crop to be harvested.

3. The tractor of claim 1 comprising:

right and left hitch means on the tractor, a towed over the row trailer, mating right and left hitch means on said towed over the row trailer, said right and left hitch means and said right and left mating hitch means cooperating to provide universal movement therein, means mounted on said towed over the row trailer for performing auxiliary plant enhancement functions, and means on said towed over the row trailer for contacting the underlying surface for providing movement thereover.

4. The tractor of claim 1 comprising:

means mounted on ones of said right side frame and said left side frame for performing auxiliary plant enhancement functions.

5. The tractor of claim 1 comprising:

a trailer, hitch means for connecting said trailer to the tractor, and means mounted on said trailer for performing auxiliary plant enhancement functions, so that more than one row of the plurality of plant rows is contacted when the tractor movement is between ones of the plurality of plant rows.

6. The tractor of claim 2 wherein said means on said towed over the row harvester for contacting the underlying surface comprises:

a right wheel, and a left wheel, further comprising means for extending and controlling said right wheel between a lowered position and a retracted normal running position, means for extending and controlling said left wheel between a lowered position and a retracted normal running position, so that when the underlying surface is laterally sloped the lower of said right wheel and said left wheel can be extended from said normal running position to laterally level said towed over the row harvester.

7. The tractor of claim 1 wherein said traction means comprises:

continuous tracks.

8. The tractor of claim 5 wherein said means on said trailer for contacting the underlying surface comprises:

a right wheel, and a left wheel, further comprising means for controlling and extending said right wheel between a lowered position and a retracted normal running position, means for controlling and extending said left wheel between a lowered position and a retracted normal running position, so that when the underlying surface is laterally sloped the lower of said right wheel and said left wheel can be extended from said normal running position to laterally level said trailer.

9. The tractor of claim 8 comprising:

means for connecting said level sensing means to said means for controlling and extending said right wheel and to said means for controlling and extending said left wheel.

10. The tractor of claim 6 comprising:

additional level sensing means on said towed over the row harvester, said additional level sensing means being connected to said means for extending and controlling said right wheel and to said means for extending and controlling said left wheel.

11. A multi-use tractor for running on an underlying surface for carrying a harvesting tool along a row of plants carrying a crop in a plurality of plant rows growing from the underlying surface, comprising a split frame having a right frame side and a left frame side, traction means fixedly mounted on said right frame side and on said left frame side for contacting the underlying surface, a power source mounted in fixed position on said split frame for driving said traction means, auxiliary equipment mounted in fixed position on said split frame, means for driving said auxiliary equipment fixedly mounted on said split frame, a tractor and auxiliary equipment control station located in fixed position on said split frame, said power source, auxiliary equipment, means for driving, and tractor and auxiliary equipment control station being dispersed over said right frame side and said left frame side and being in substantially constant elevation over the underlying surface, a lateral cross member having a right end and a left end, means mounted on said right frame side for receiving said right end for generally vertical sliding movement therein, means mounted on said left frame side for receiving said left end for generally vertical sliding movement therein, first controllable means for moving said lateral cross member right end in elevation relative to said right frame side, second controllable means for moving said lateral cross member left end in elevation relative to said left frame side, and means for sensing level of said lateral cross member and for actuating said first and second controllable means to adjust the elevation of said right end and said left end relative to said right frame side and said left frame side, respectively, to achieve a level condition in said lateral cross member.

12. The multi-use tractor of claim 11 comprising:

a hitch extending from the rear of said lateral cross member, an over the row trailer, an over the row mating hitch on said over the row trailer, said hitch and said mating hitch providing universal motion between the tractor and said over the row trailer, means for supporting said over the row trailer on the underlying surface and for providing movement thereover, and means on said over the row trailer for performing a predetermined operation on the row of plants.

13. The multi-use tractor of claim 11 comprising:

right and left hitch means on said right frame side and said left frame side respectively, an over the row trailer, wheels on opposing sides of said over the row trailer for providing movement thereof on the underlying surface, right and left mating hitch means on said over the row trailer disposed to engage said right and left hitch means and cooperating therewith to provide tracking of said wheels on said over the row trailer with said right frame side and said left frame side, and means on said over the row trailer for performing a predetermined operation on the row of plants.

14. The multi-use tractor of claim 11 comprising:

a trailer, hitch means for connecting said trailer to the tractor, means mounted on said trailer for performing a predetermined operation on the row of plants, so that multiple rows of the plurality of plant rows are available to said means for performing a predetermined operation when the trailer is drawn between rows by the multi-purpose tractor.

15. The multi-use tractor of claim 11 comprising:

means mounted on said split frame for performing a predetermined operation on the row of plants.

16. The multi-use tractor of claim 11 wherein said traction means comprises:

continuous tracks.

17. The multi-use tractor of claim 12 wherein said means for supporting said over the row trailer comprises:

a left wheel, and a right wheel, comprising in addition first means for positioning said right wheel between extended and retracted positions, second means for positioning said left wheel between extended and retracted positions, additional level sensing means mounted on said over the row trailer connected to said first and second means for positioning, so that when the underlying surface is laterally sloped the higher one of said right wheel and said left wheel is retracted from said extended position to laterally level said over the row trailer.

18. An over the row configured tractor for working over a row of plants in a field of multiple rows of plants and for working between rows and on multiple rows, comprising a right frame, a left frame, a power source mounted in fixed position on one of said right frame and said left frame, a right continuous track assembly mounted to and beneath said right frame for contacting the field and being connected to said power source, a left continuous track assembly mounted to and beneath said left frame for contacting the field and being connected to said power source, a lateral level bar having a right end and a left end, right means mounted on said right frame for supporting said right end and for providing vertical movement of said right end relative to said right frame and said right continuous track, left means mounted on said left frame for supporting said left end and for providing vertical movement of said left end relative to said left frame and said left continuous track, level sensing means on said lateral level bar providing a signal connected to said right means mounted on said right frame and said left means mounted on said left frame, said signal operating on said right means and said left means first to move the higher side of said lateral level bar down and second to move the lower side of said lateral level bar up, whereby the center of gravity of said over the row configured tractor stays substantially the same on laterally sloping surfaces without regard to the vertical position of said lateral level bar relative to the field.

19. The over the row configured tractor of claim 18 wherein said right means mounted on said right frame comprises:

a right tower, a vertical slide within said right tower for engaging said lateral level bar right end, and right power means for receiving said signal from said level sensing means, and wherein said left means mounted on said left frame comprises a left tower, a vertical slide within said left tower for engaging said lateral level bar left end, and left power means for receiving said signal from said level sensing means.

20. The over the row configured tractor of claim 18 comprising:

a trailer having a framework, an over the row flexible hitch connecting said trailer to said lateral level bar, left and right wheels mounted on said trailer framework supporting said trailer on the field, left power means connected to said power source and disposed between said trailer framework and said left wheel for moving said left wheel between extended and retracted positions, right power means connected to said power source and disposed between said trailer framework and said right wheel for moving said right wheel between extended and retracted positions, and trailer leveling means providing a leveling signal connected to said left and right power means, so that said left and right power means operate first to retract the one of said left and right wheels on the high side and second to extend the one of said left and right wheels on the low side.

21. The over the row configured tractor of claim 20 comprising:

a harvester head mounted in said trailer, and means for coupling said power source to said harvester head.

22. The over the row configured tractor of claim 18 comprising:

means mounted on the tractor for performing auxiliary plant enhancement functions.

23. The over the row configured tractor of claim 20 comprising:

means mounted on said trailer for performing auxiliary plant enhancement functions.

* * * * *